(12) United States Patent
Stauffer et al.

(10) Patent No.: US 9,102,217 B2
(45) Date of Patent: Aug. 11, 2015

(54) AIR CURTAIN

(75) Inventors: Louise E. Stauffer, Bloomfield Hills, MI (US); Alan L. Browne, Grosse Pointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1366 days.

(21) Appl. No.: 12/607,178

(22) Filed: Oct. 28, 2009

(65) Prior Publication Data
US 2011/0097985 A1 Apr. 28, 2011

(51) Int. Cl.
*B60H 1/24* (2006.01)
*B60J 5/04* (2006.01)
*B60J 9/04* (2006.01)

(52) U.S. Cl.
CPC .... *B60J 5/04* (2013.01); *B60J 9/04* (2013.01); *B60H 1/24* (2013.01)

(58) Field of Classification Search
CPC ............... B60H 1/24; B60H 9/04; B60J 9/04
USPC ......................................................... 454/162
See application file for complete search history.

(56) References Cited

U.S. PATENT DOCUMENTS

| | | | | |
|---|---|---|---|---|
| 3,122,169 A | * | 2/1964 | Kendall | 138/31 |
| 3,602,126 A | * | 8/1971 | Breitschwerdt | 454/124 |
| 4,173,174 A | * | 11/1979 | Vinko et al. | 454/152 |
| 4,233,707 A | | 11/1980 | Leblanc | |
| 4,344,458 A | * | 8/1982 | Zahid | 138/30 |
| 4,364,416 A | * | 12/1982 | Jacobellis et al. | 138/30 |
| 4,851,066 A | * | 7/1989 | Currier et al. | 156/244.11 |
| 4,870,390 A | * | 9/1989 | Hosoda et al. | 340/453 |
| 4,870,895 A | * | 10/1989 | Mayer | 454/120 |
| 4,979,809 A | | 12/1990 | Peters | |
| 5,001,966 A | | 3/1991 | McIntyre et al. | |
| 5,097,563 A | | 3/1992 | Cowan | |
| 5,140,719 A | * | 8/1992 | Cowan | 15/313 |
| 5,301,689 A | * | 4/1994 | Wennerholm | 128/848 |
| 5,456,787 A | * | 10/1995 | Myles | 156/321 |
| 5,486,139 A | | 1/1996 | Papp | |
| 5,546,630 A | | 8/1996 | Long | |
| 5,591,078 A | * | 1/1997 | Filion et al. | 454/124 |

(Continued)

FOREIGN PATENT DOCUMENTS

| | | | | |
|---|---|---|---|---|
| JP | 61096349 A | * | 5/1986 | ............... B60H 1/34 |
| JP | 06-022030 U | | 3/1994 | |

(Continued)

*Primary Examiner* — Steven B McAllister
*Assistant Examiner* — Frances F Hamilton

(57) ABSTRACT

An air shield is provided over a portal access opening between a vehicle access member and a stationary vehicle trim member. The vehicle access member provides access to a compartment of an interior of the vehicle. An air supply device is disposed within the vehicle. The air supply device is capable of producing a burst of air that discharges upon opening of the vehicle access member. An air concentrator device is in fluid communication with the air supply device. The air concentrator device outputs the burst of air that forms the air shield in a direction substantially transverse to the portal opening. The air shield is formed across at least a portion of a perimeter of the portal access opening between the vehicle access member and the stationary vehicle trim member. The air shield inhibits precipitation from entering the compartment of the vehicle during a pressure equalization phase that occurs in response to the opening of the vehicle access member.

17 Claims, 6 Drawing Sheets

(56) References Cited

U.S. PATENT DOCUMENTS

| | | | |
|---|---|---|---|
| 5,765,635 A * | 6/1998 | Rhee | 165/203 |
| 6,135,874 A * | 10/2000 | Weber | 454/124 |
| 6,158,769 A * | 12/2000 | Swann et al. | 280/736 |
| 6,249,931 B1 | 6/2001 | Sato | |
| 6,290,361 B1 | 9/2001 | Berzin | |
| 6,358,138 B1 * | 3/2002 | Alder | 454/124 |
| 6,603,662 B1 * | 8/2003 | Ganrot | 361/698 |
| 6,655,712 B1 * | 12/2003 | Larsen et al. | 280/736 |
| 6,759,159 B1 * | 7/2004 | Gray et al. | 429/71 |
| 7,040,328 B2 | 5/2006 | Woodard | |
| 7,434,395 B2 * | 10/2008 | He | 60/476 |
| 2005/0282485 A1 * | 12/2005 | Kato et al. | 454/136 |
| 2006/0270332 A1 * | 11/2006 | Kober et al. | 454/69 |
| 2011/0203673 A1 * | 8/2011 | Alvi | 137/13 |

FOREIGN PATENT DOCUMENTS

| | | |
|---|---|---|
| JP | 2004058929 A * | 2/2004 |
| JP | 2005-349979 A | 12/2005 |
| JP | 4105495 B2 | 6/2008 |
| WO | 96-01755 A1 | 1/1996 |

* cited by examiner

AIR CURTAIN

BACKGROUND OF INVENTION

An embodiment relates generally to an air shield for portal openings for a vehicle.

Vehicles portals include doors, trunks, and windows that are opened and closed for allowing access in and out of the vehicle. Such doors, trunks, and windows inhibit precipitation in the form of rain or snow from entering the vehicle.

Precipitation, such as snow, accumulates upon a respective vehicle door and the nearby roof of the vehicle. When the accumulation is present and the door is opened, a vacuum created in the vehicle interior during by the opening of the door which results in some accumulation as well as airborne precipitation being drawn into the interior. The precipitation typically lands on the vehicle seat and/or other internal member. The snow begins to melt once the snow reaches the interior component forming a wet precipitation on the vehicle member. Such an event can similarly occur with respect to other environmental conditions such as rain (e.g., following a car wash), fog, or particulates blowing in the air. Add-on exterior trim components, such as gutters or dams, can be added to the vehicle roofs or doors; however, such components are aesthetically displeasing and can negatively affect fuel economy.

SUMMARY OF INVENTION

An advantage of an embodiment of the invention is the reduction of precipitation drawn into to a vehicle compartment when a vehicle access member is opened. An air shield is created for inhibiting the precipitation from entering the portal access opening during a pressure equalization phase which typically creates a vacuum during an initial opening of the vehicle access member.

An embodiment contemplates an air shield provided over a portal access opening between a vehicle access member and a stationary vehicle trim member. The vehicle access member provides access to a compartment of an interior of the vehicle. An air supply device is disposed within the vehicle. The air supply device is capable of producing a burst of air that discharges upon opening of the vehicle access member. An air concentrator device is in fluid communication with the air supply device. The air concentrator device outputs the burst of air that forms the air shield in a direction substantially transverse to the portal opening. The air shield is formed across at least a portion of a perimeter of the portal access opening between the vehicle access member and the stationary vehicle trim member. The air shield inhibits precipitation from entering the compartment of the vehicle during a pressure equalization phase that occurs in response to the opening of the vehicle access member.

An embodiment contemplates a method for inhibiting precipitation from entering a compartment of a vehicle during a pressure equalization phase that occurs in response to an opening of a vehicle access member. The precipitation is formed at a joint coupling of the vehicle access member and a vehicle stationary trim member. The vehicle access member is provided for accessing an interior compartment of a vehicle through a portal access member. A burst of air is generated in response to an opening of the vehicle access member. The burst of air is output through an air concentrator device wherein the burst of air forms an air shield that inhibits a substantial amount of precipitation from entering the vehicle during the opening of the vehicle access member.

DETAILED DESCRIPTION

Figure 1:
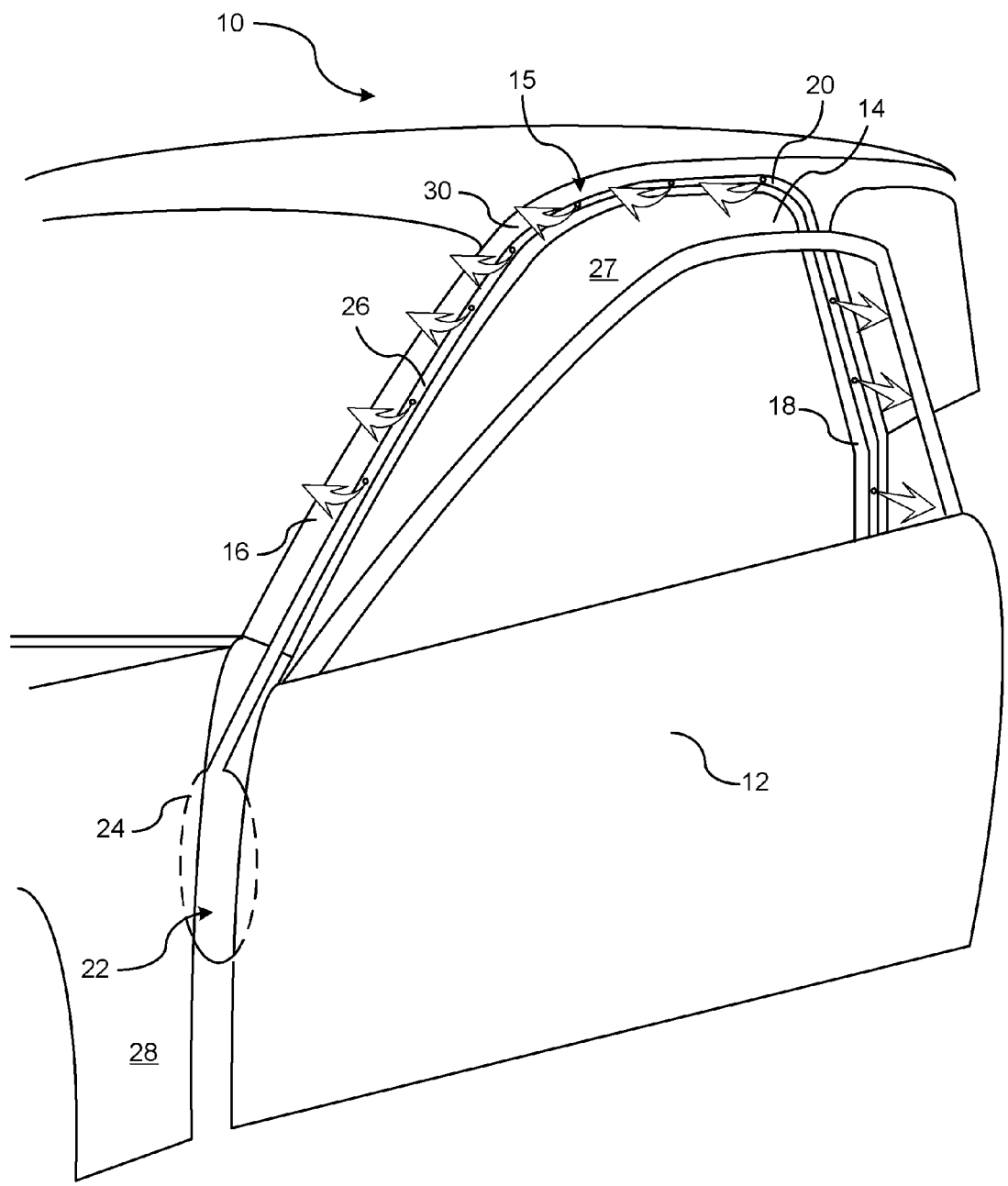
FIG. 1 is a perspective view of a vehicle of a vehicle integrating the air shield system according to a first preferred embodiment of the invention.

There is shown generally, in FIG. 1, a vehicle 10 having a vehicle access member 12 which provides a portal access opening 14 to a compartment of the vehicle when opened. The vehicle access member 12 is a moveable panel or the like that is opened manually by a person accessing a respective compartment of the vehicle or may be a motorized vehicle access member that automatically opens when a switch is actuated. The vehicle access member 12 may include, without limitation, vehicle doors, windows, sunroofs, hatchbacks, tailgates, or trunks. The vehicle access member 12 is not restricted to access members that provide access to the interior passenger compartment of the vehicle; rather, the access members may provide access to any compartment of the vehicle for which any moveable vehicle access member is used to isolate environmental elements from a respective compartment.

In an embodiment as shown FIG. 1, the vehicle access member 12 includes a vehicle door for gaining access to the interior passenger compartment. The vehicle door is hinged to a body of the vehicle for pivoting the door between an open position and a closed position. When the vehicle door is in the open position, a person may gain access to the vehicle through the portal access opening 14. When the vehicle door is in the closed position, the vehicle door is sealed against a stationary vehicle trim member 15, such as the vehicle body door frame, that includes an A-pillar 16, a B-pillar 18 and an edge of a roof region 20 continuously adjoining the A-pillar 16 and the B-pillar 18. When the vehicle door is in the closed position, the vehicle door forms a barrier for preventing environmental elements (e.g., snow, rain, wind, and debris) from entering the interior of the vehicle.

Environmental elements, such as rain, are typically routed away from the coupling joint between the vehicle door and the door frame through a drain channel formed therebetween. However, precipitation may not be entirely purged form the coupling joint and residual precipitation may remain in the coupling joint. Similar to rain, snow forms over the coupling joint between the vehicle door and the door frame. If the snow is unmelted, snow may remain over the coupling joint, thereby creating the risk of precipitation entering the interior of the vehicle when the vehicle door is pivoted from the closed position to the open position. Precipitation entering into the interior of the vehicle is the result of a vacuum caused by an unequalized pressure between the interior of the vehicle and the exterior of the vehicle when the vehicle door is initially opened which draws falling precipitation into the interior vehicle and typically onto the vehicle seat.

An air shield system, shown generally at 22, includes an air supply device 24 and an air concentrator device 26. The air supply device 24 is in fluid communication with the air concentration device 26. The air concentrator device 26 outputs an instantaneous burst of air that forms an air shield 27. The air shield 27 is generated in a direction substantially transverse to the portal access opening 14. The air shield 27 is formed across at least a portion of a perimeter of the portal access opening between the vehicle door and the vehicle door frame. The air shield 27 prevents a substantial amount of precipitation from entering the interior of the vehicle during a pressure equalization phase that occurs when the vehicle door is initially opened.

The air supply device 24 may include, but is not limited to, an accumulator or similar device for storing air, or a pump or similar device for generating pressurized air. In FIG. 1, a bladder-type accumulator is disposed between the vehicle door and a front fender in a pocketed area 28 known as a front body hinge pillar (FBHP). The bladder-type accumulator is preferably constructed from a resilient material, including by not limited to, rubber, polypropylene, or an elastomeric compound. The bladder-type accumulator is capable of being compressed for discharging air at a respective rate that generates a burst of air. The bladder-type accumulator is positioned within the FBHP so that the opening of the vehicle door causes a portion of the vehicle door or an extending member of the vehicle door (e.g., hinge member) to act on the accumulator thereby compressing the accumulator. The compression of the accumulator generates the burst of air. When the vehicle door is closed, the vehicle door and extending member ceases from acting on the accumulator. The accumulator is then re-filled with air. Refilling the accumulator can be performed using a valve (e.g., one way valve) which allows air to enter the accumulator as the accumulator transitions from a compressed state to an uncompressed state.

The air concentrator device 26 is an air output supply device that outputs the burst of air generated by the air supply device 24. The air concentrator device 26 concentrates the burst of air in a direction substantially transverse to the portal opening for creating the air shield 27. The air shield provides a temporary barrier which prevents the environmental elements from falling into the portal access opening 14 during a pressure equalization phase between the interior and exterior of the vehicle when the vehicle access member 12 is opened. Typically, when a vehicle access member 12 is opened, there is an unequalized pressure between the interior of the vehicle and the exterior of the vehicle. As the vehicle access member 12 is opened, a vacuum is created thereby drawing air and environmental elements into the vehicle, such as precipitation onto the vehicle seats. The air shield 27 provides a temporary shelter that prevents precipitation disposed over the joint coupling of vehicle body frame and the attaching vehicle access member 12 from falling into the portal access opening 14 while the pressure between the exterior of the vehicle and the interior of the vehicle is equalized. The burst of air output from the air concentrator device 26 also forces (i.e., blows) falling precipitation out of the portal access opening 14. The burst of air output from the air concentrator device 26 should be forced in a direction substantially away from a person entering the vehicle so that the precipitation is not blown on the person.

Figure 2:
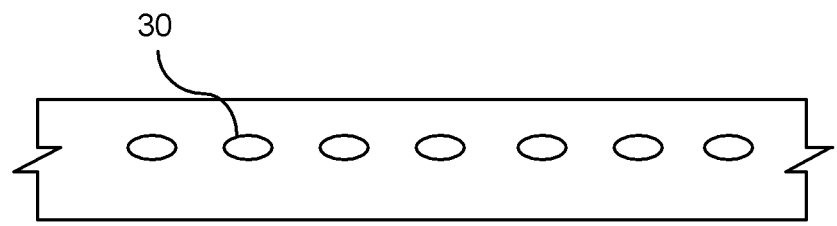
FIG. 2 is a cross section view of an air concentrator device according to the first preferred embodiment of the invention.
Figure 3:
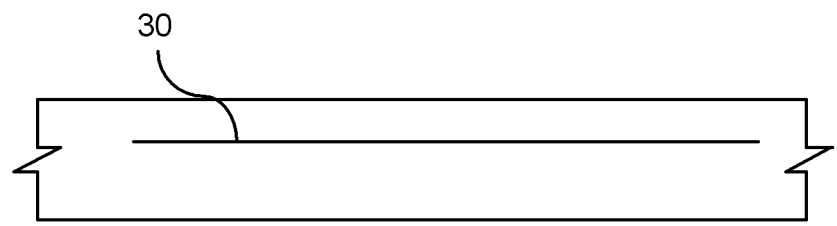
FIG. 3 is a cross section view of an air concentrator device according to the second preferred embodiment of the invention.
Figure 4:
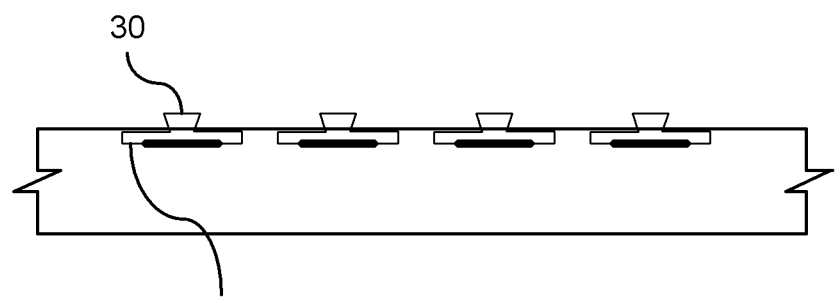
FIG. 4 is a cross section view of air jet generators according to the third preferred embodiment of the invention.

The air concentrator device 26 is an elongated conduit strip that includes at least one output port 30 disposed throughout the strip for preferably generating a flat stream of air. The output port 30 may include, but is not limited to, a plurality of holes (e.g., orifices) formed in the strip (FIG. 2), one or more slits formed in the strip (FIG. 3), and active materials or embedded nozzles formed in the strip (FIG. 4). The outlet port 30 is formed throughout the strip or at one or more selected portions of the strip for generating the stream of air, preferably a flat stream of air, which provides a uniform barrier (e.g., air shield) for inhibiting precipitation from entering the portal access opening during the pressure equalization phase.

A beginning and ending position of the output port 30 of the air concentrator device 26 is dependent on the contour of the vehicle access member 12, but preferably should start and end at respective positions which prevent desired interior regions of the vehicle from receiving unwanted precipitation. For example, the air concentrator device 26 may initiate on the base of the A-pillar 16 and continuously extend around the edge of the roof 20 and terminate along the B-pillar 18. It should be understood that the beginning and ending positions of the output port 30 may be shorter or longer than that what is describe herein.

The air pressure device 24 may be coupled directly the air concentrator device 26 or a tubular member may fluidically connect the air pressure device 24 and the air concentrator device 26. The tubular member couples to the air supply device 24 at the FBHP and extends to the A-pillar 16 to the location where the air concentrator device 26 is located. The tubular member may be made from flexible material or rigid material. Utilizing rigid material may require preforming the tubular member to a contour of the vehicle door or door frame. The tubular member should preferably make an air tight connection between the air supply device 24 and the air concentrator device 26 so that no pressure drop occurs during the air burst operation. Alternatively, the tubular member 28 may be integrally formed as part of the air supply device 24.

In an embodiment, the air concentrator device 26 may include a primary or auxiliary seal disposed between the stationary vehicle trim member 15 and the vehicle access member 12 commonly disposed on the vehicle. The seal is commonly coupled to the stationary vehicle trim member 15 or may be coupled to the vehicle access member 12. The seal includes an interval cavity and a plurality of output ports, such as orifices, for outputting and directing the burst of air in a direction transverse to the portal opening. The closing of the vehicle access member 12 compresses the seal and closes off the orifices. The internal cavity may be preloaded with air (i.e., pressurized air) so that when the vehicle access member 12 is opened, the orifices are unblocked and an instantaneous burst of air is directed across the portal opening 14.

In yet another embodiment, suitable active materials may be used in the air concentrator device 26. Active material refers to a material that exhibits a significant change in some fundamental property such as modulus, dimensions, shear strength, etc., upon exposure to an appropriate external field which can take on a different form such as thermal or stress fields for shape memory alloys (SMA's), magnetic fields for magnetostrictives such as terfenol and galfenol, thermal for shape memory polymers (SMP's), and voltage for a dielectric elastomer form of electroactive polymer (EAP). The benefits of using active materials provides opportunities for mass reduction, compact packaging, quiet operation, device simplicity, and reduced cost compared to traditional actuation of air devices such as motors and solenoids.

Shape memory materials generally refer to materials or compositions that have the ability to remember an original attribute such as shape, which can subsequently be recalled by application or removal of an external stimulus. Deformation from the original shape is a temporary condition. The shape memory materials can change to the trained shape in response to an activation signal. Exemplary shape memory materials include the afore-mentioned shape memory alloys and polymers in addition to shape memory ceramics, electroactive polymers, ferromagnetic SMA's, electrorheological compositions, magnetorheological compositions, dielectric elastomers, ionic polymer metal composites, piezoelectric polymers, piezoelectric ceramics, and various combinations of the foregoing materials.

The use of such active materials could eliminate the requirement of a bladder or distribution network for the pressurized air to the output ports. For example, active materials could be implemented as an array of discrete air jet generators (shown in FIG. 4) aligned along a perimeter of the portal access opening. The air jet generator could include synthetic air jet generators utilizing a thin film diaphragm 31 for each respective air jet made of galfenol for example. The use of discrete synthetic air jet generators would not increase the door opening effort which may otherwise occur with the use of the compressed bladder in pocketed area.

In yet another embodiment, active materials may be used to pressurize an accumulator, for example, with the use of piezo pumps or EAP diaphragm pumps, and used in an openable/closeable nozzle-type of orifice to allow the flow of pressurized air to generate the burst of air. The opening and closing of the active material acts as valves for opening and closing the output ports. This can be accomplished by sliding a perforated strip from a blocking position to a hole-to-hole alignment with air jet nozzles thereby releasing the flow of pressurized air for creating the air curtain. An advantage of utilizing the active materials would keep the orifices closed except when in use for outputting the burst of air. This reduces the likelihood of contaminants entering an otherwise always open orifice which then could become blocked.

The air shield system 22, as illustrated in FIG. 1 is preferably mounted to the vehicle body frame (e.g., door). The output port 30 should be positioned so that the directional flow of the air burst is directed away from the person entering the portal access opening 14 such that precipitation is not blown on the person's body or face. For example, for a vehicle door, the person entering the portal access opening 14 typically stands at the rear of the vehicle door to allow the vehicle door to pivot open. Therefore, the air burst should be focused in a direction other than a rearward direction (i.e. in a direction away from where a person entering the vehicle would be positioned).

Figure 5:
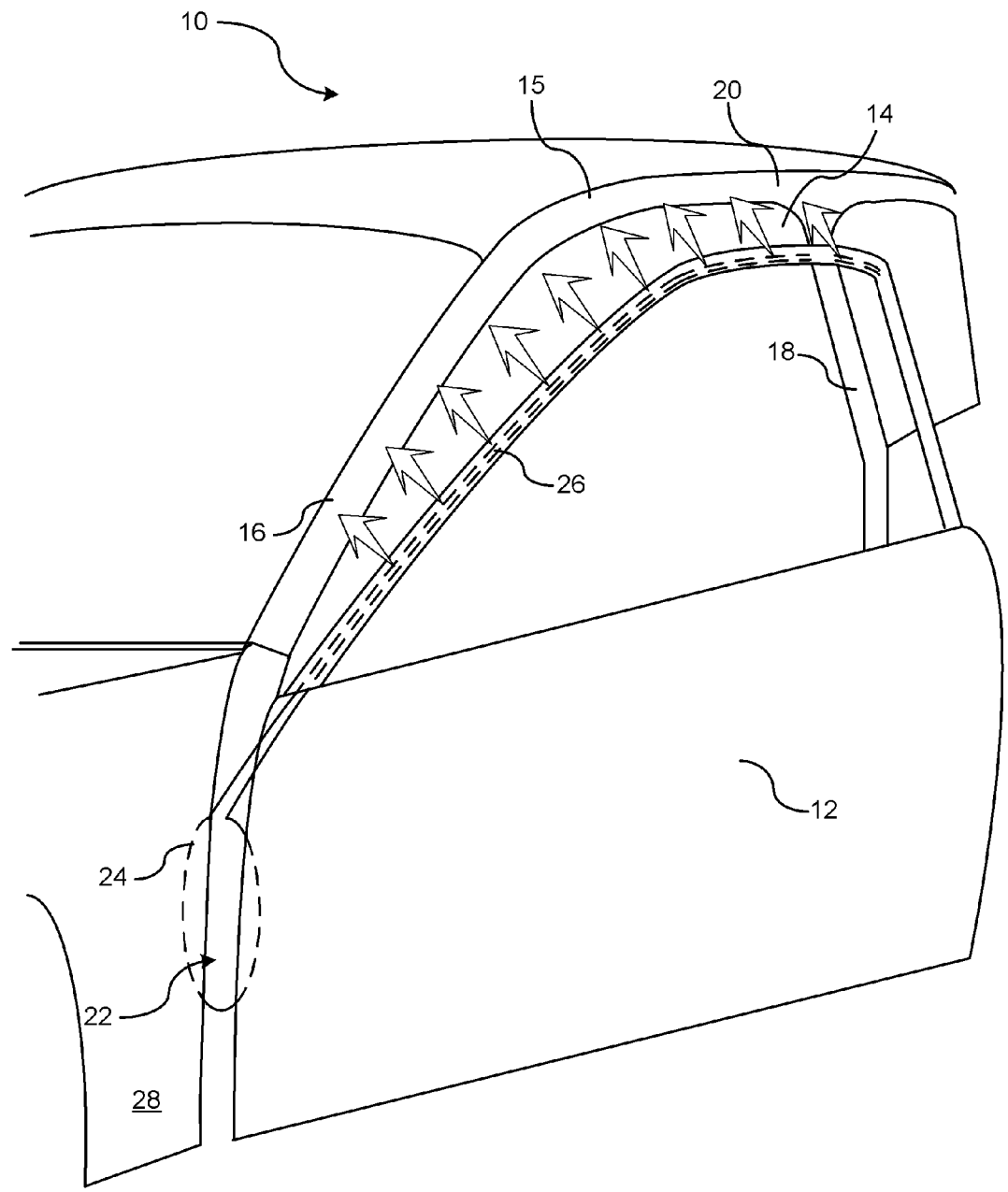
FIG. 5 is a perspective view of a vehicle of a vehicle integrating the air shield system according to a fourth preferred embodiment of the invention.

FIG. 5 illustrates an embodiment where the air shield system is mounted to the vehicle access member (e.g., vehicle door). This would allow the air concentrator device 26 to direct the air burst toward and over the vehicle roof.

Figure 6:
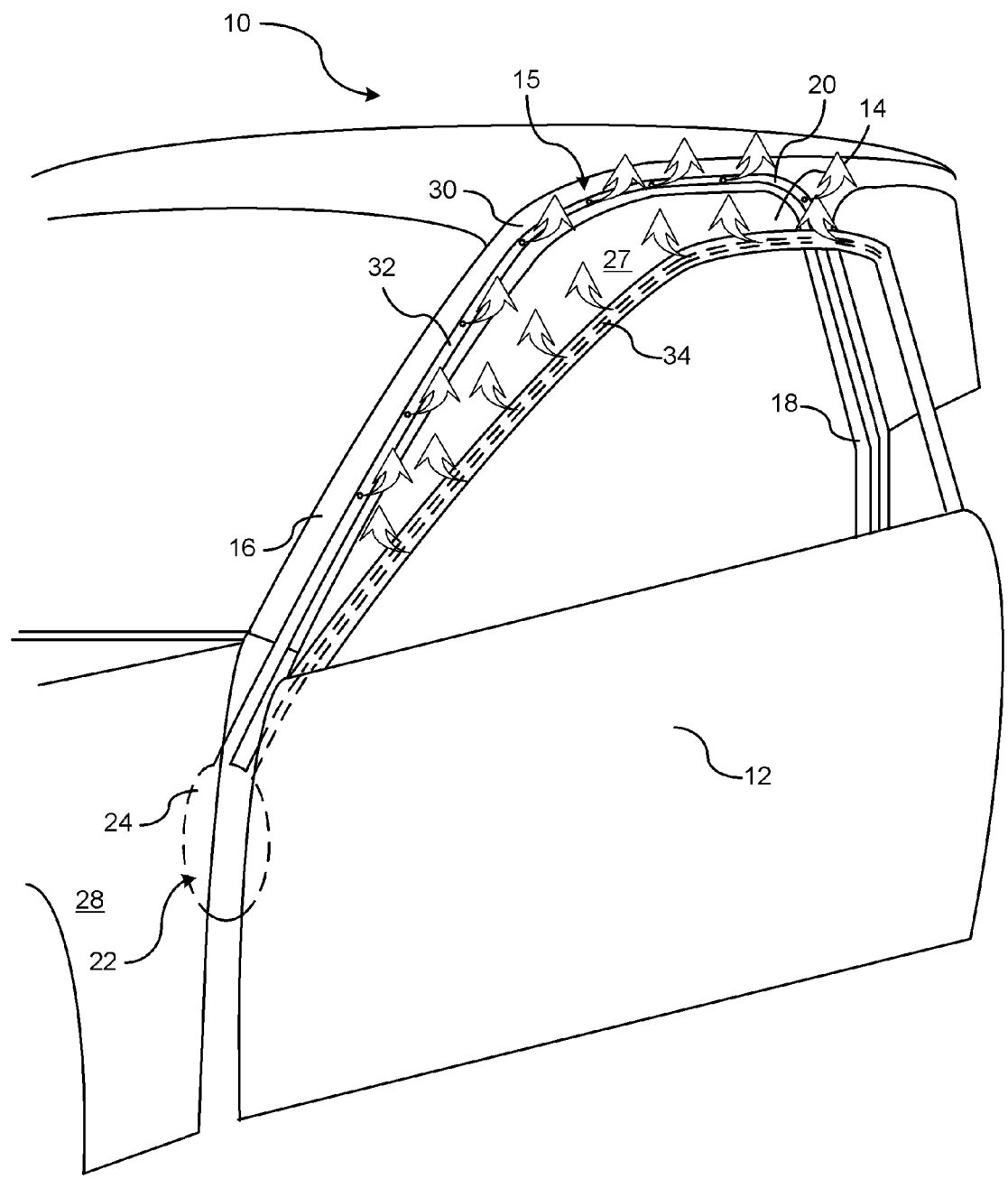
FIG. 6 is a perspective vehicle view of a vehicle integrating the air shield system according to a fifth preferred embodiment of the invention.

FIG. 6 illustrates an embodiment where the air shield system includes air concentrator devices 32 and 34 mounted to both the stationary vehicle trim member 15 (e.g., door frame) and to the vehicle access member 12 (e.g., vehicle door). The air concentrator device 32 mounted to the door frame directs the burst of air toward the vehicle access member 12. The air concentrator device 34 mounted on the vehicle access member 12 directs a burst of air toward the stationary vehicle trim member 15. The burst of air from the respective air concentrator devices directed at one another dam each other thereby cooperatively forming an air shield for inhibiting precipitation from entering the interior of the vehicle. The respective air concentrator devices preferably should be directed so that when the two respective burst of air meet, the resulting air flow is dammed and the resulting air flow is directed upward away from a person's face. In the case of a sedan, due to the low profile of the vehicle in comparison to an SUV, the resulting air flow may be directed both upward and forward of the vehicle to avoid the person entering the portal access opening of the vehicle.

Figure 7:
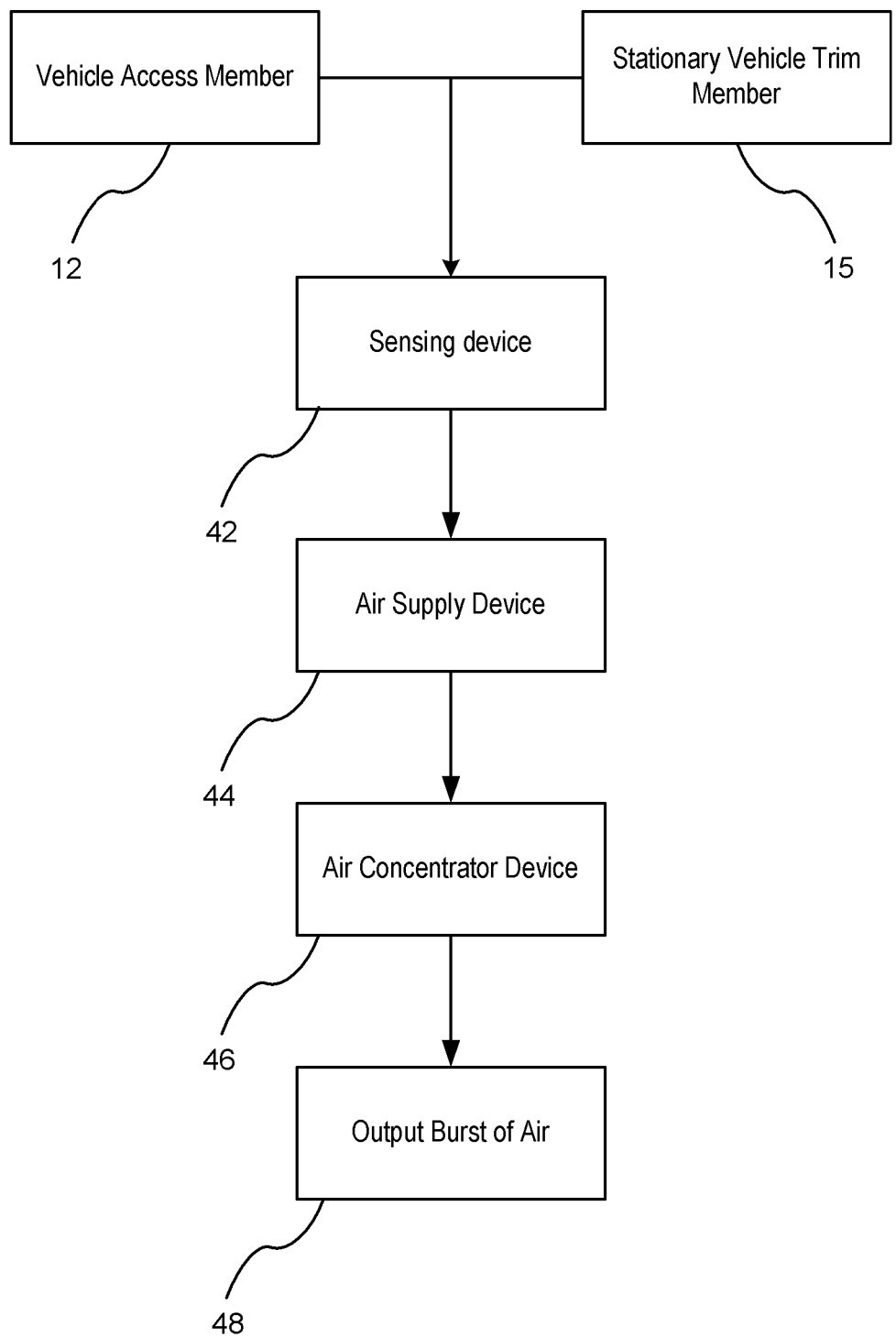
FIG. 7 is a block diagram of an air shield system according to a sixth preferred embodiment of the invention.

FIG. 7 is a block diagram of an air shield system utilizing an air pump. In FIG. 7, the vehicle access member 12 and the stationary vehicle trim member 15 cooperatively form the portal access opening as described earlier. A switch 42 monitors the opening of the vehicle access member 12. Vehicles are commonly equipped with such devices for forewarning the passengers of the vehicle that a respective vehicle access member is ajar and not fully closed.

The switch 42 upon sensing that the vehicle access member 12 is being opened actuates the air supply device 44. The air supply device 44 includes an air pump which may generate the burst of air instantaneously when the switch is actuated. The burst of air is provided to the air concentrator device 46. In block, 48, the air concentrator device outputs the burst of air for forming the air shield over the portal access opening. If a switch is used to sense an opening of the vehicle access member for actuating the air supply device such as an air pump, then controls may be implemented limiting the occurrence of triggering the burst of air. For example, controls may be implemented such that the burst of air only occurs when the vehicle is in a park position or when the vehicle velocity is zero or below a predetermined speed or when precipitation is sensed by a windshield wiper condensation sensor mounted to the vehicle. Such limitations help reduce nuisance activations when the air burst may not be wanted.

Figure 8:
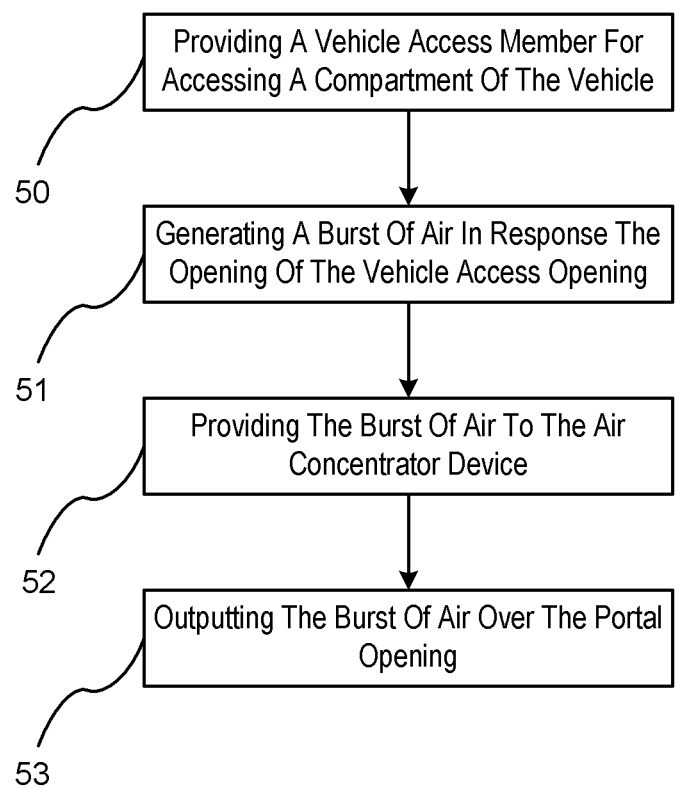
FIG. 8 is a flow diagram of a method of the air shield process.

FIG. 8 illustrates a method for generating an air shield over a portal access opening of a vehicle. In step 50, a vehicle access member is provided for accessing an interior compartment of a vehicle. The vehicle access member may include, but is not limited to, vehicle doors, windows, sunroofs, hatchbacks, tailgates, or trunks or any other moveable vehicle body member that provides access to a vehicle compartment.

In step 51, a burst of air is generated by an air supply device in response to the opening of a vehicle access member. The air supply device may include accumulators, air pumps, or any other air storage or air generation device capable of generating or providing a burst of air.

In step 52, the burst of air is provided to the air concentrator device for outputting the burst of air over a portal access opening. In step 53, the air concentrator device outputs the burst of air for forming the air shield which prevents precipitation from entering the interior of the vehicle during a pressure equalization phase. The burst of air is generated in a direction or is manipulated so that the burst of air does not carry precipitation and other environmental elements directly at a respective person's face and body.

While certain embodiments of the present invention have been described in detail, those familiar with the art to which this invention relates will recognize various alternative designs and embodiments for practicing the invention as defined by the following claims.

What is claimed is:

1. An apparatus for providing an air shield over a portal access opening between a vehicle access member and a stationary vehicle trim member, the vehicle access member providing access to a compartment of an interior of the vehicle, the apparatus comprising:

an air supply device disposed within the vehicle, the air supply device producing a burst of air that discharges upon opening of the vehicle access member;

an air concentrator device in fluid communication with the air supply device, the air concentrator device outputting the burst of air that forms the air shield in a direction substantially transverse to the portal access opening, wherein the air shield is formed across at least a portion of a perimeter of the portal access opening between the vehicle access member and the stationary vehicle trim member, and wherein the air shield inhibits precipitation from entering the compartment of the vehicle during a pressure equalization phase that occurs in response to the opening of the vehicle access member, the air concentrator device including an elastomeric seal creating a seal between the stationary vehicle trim member and the vehicle access member, the elastomeric seal including an internal cavity and at least one orifice, the burst of air is directed through the internal cavity in the elastomeric seal and flows out of the at least one orifice of the elastomeric seal in the transverse direction;

wherein the air supply device includes an accumulator, wherein the accumulator is compressible, and wherein the accumulator is discharged by the vehicle access member compressing the accumulator during opening of the vehicle access member.

2. The apparatus of claim 1 wherein the air concentrator device is disposed on the vehicle access member, wherein the burst of air is directed toward the stationary vehicle trim member.

3. The apparatus of claim 1 wherein the air concentrator device is disposed on the stationary vehicle trim member, wherein the burst of air is directed toward the vehicle access member.

4. The apparatus of claim 1 further comprising a second air concentrator device disposed on the vehicle access member directing a burst of air toward the stationary vehicle access member, wherein the air concentrator device is disposed on the stationary vehicle trim member and, wherein the air concentrator device directs the burst of air toward the vehicle access member, wherein the respective bursts of air directed at one another cooperatively form the air shield for inhibiting precipitation from entering the interior of the vehicle.

5. The apparatus of claim 1, further comprising a switch, wherein the opening of the vehicle access member actuates the switch, wherein the accumulator is discharge in response to the actuation of the switch.

6. The apparatus of claim 1 further comprising a sensing device for sensing the opening of the vehicle access member, wherein the air supply device includes a pump, wherein the pump generates a burst of air in response to actuation of the sensing device.

7. The apparatus of claim 1 wherein the air concentrator device includes a plurality of nozzles for directing the burst of air in transverse direction substantially transverse to the portal access opening.

8. The apparatus of claim 1 wherein the air concentrator device includes an elongated slit for directing the burst of air in the transverse direction.

9. The apparatus of claim 1 wherein the air concentrator device comprises an active material that exhibits a change in shape creating at least one orifice, the at least one orifice created by the change in shape outputs a burst of air in the transverse direction, and wherein the active material returns to an original shape closing off the at least one orifice.

10. The apparatus of claim 9 wherein the active material comprises a shape memory alloy.

11. The apparatus of claim 9 wherein active material comprises a shape memory polymer.

12. The apparatus of claim 9 wherein active material comprises a shape memory ceramic.

13. The apparatus of claim 9 wherein the active material is selected from a group including shape memory alloys, ferromagnetic shape memory alloys, shape memory polymers, piezoelectric materials, electroactive polymers, magnetorheological fluids and elastomers, electrorheological fluids, and composites of the same.

14. The apparatus of claim 1 wherein the air supply device comprises an active material creating the burst of air.

15. The apparatus of claim 14 wherein the air supply device comprises air jet generators formed by the active material.

16. The apparatus of claim 15 wherein air jet generators include a synthetic air jet generator having a thin film diaphragm.

17. An apparatus for providing an air shield over a portal access opening between a vehicle access member and a stationary vehicle trim member, the vehicle access member providing access to a compartment of an interior of the vehicle, the apparatus comprising:

an air supply device disposed within the vehicle, the air supply device producing a burst of air that discharges upon opening of the vehicle access member; and an air concentrator device in fluid communication with the air supply device, the air concentrator device outputting the burst of air that forms the air shield in a direction substantially transverse to the portal access opening, wherein the air shield is formed across at least a portion of a perimeter of the portal access opening between the vehicle access member and the stationary vehicle trim member, and wherein the air shield inhibits precipitation from entering the compartment of the vehicle during a pressure equalization phase that occurs in response to the opening of the vehicle access member;

wherein the air supply device includes an accumulator, wherein the accumulator is compressible, and wherein the accumulator is discharged by the vehicle access member compressing the accumulator during opening.

* * * * *